Feb. 15, 1955   H. H. PLATT   2,702,168
CONVERTIBLE AIRCRAFT
Filed July 7, 1950   10 Sheets-Sheet 1

INVENTOR.
HAVILAND H. PLATT
BY Leonard L. Kalish
ATTORNEY.

Feb. 15, 1955 H. H. PLATT 2,702,168
CONVERTIBLE AIRCRAFT
Filed July 7, 1950 10 Sheets-Sheet 2

INVENTOR.
HAVILAND H. PLATT
BY
*Leonard L. Kalish*
ATTORNEY.

Fig. 7

Feb. 15, 1955  H. H. PLATT  2,702,168
CONVERTIBLE AIRCRAFT

Filed July 7, 1950  10 Sheets-Sheet 4

Fig. 8

INVENTOR.
HAVILAND H. PLATT
BY
Leonard L. Kalish
Attorney

Feb. 15, 1955  H. H. PLATT  2,702,168
CONVERTIBLE AIRCRAFT
Filed July 7, 1950  10 Sheets-Sheet 6

INVENTOR.
HAVILAND H. PLATT
BY

INVENTOR.
HAVILAND H. PLATT

INVENTOR.
HAVILAND H. PLATT
BY Leonard L. Kalish
ATTORNEY.

United States Patent Office 2,702,168
Patented Feb. 15, 1955

2,702,168

CONVERTIBLE AIRCRAFT

Haviland H. Platt, New York, N. Y.

Application July 7, 1950, Serial No. 172,507

15 Claims. (Cl. 244—7)

My invention relates to airplanes and more particularly to an airplane capable of taking off and landing vertically and also capable of proceeding at high speed when flying forward.

Hitherto airplanes have been handicapped in respect to utility and safety by the necessity of moving rapidly through the air in order to generate the force required for their sustentation. This requirement has limited their usefulness by making it necessary to provide large smooth and unobstructed areas for their taking off and landing. It has furthermore impaired the safety of their operation in two ways: 1, the danger of a crash due to "stalling," i. e. the inadvertent reduction of flying speed below the minimum value capable of affording support; and 2, the inability to approach and leave the ground cautiously, at a low speed. The latter limitation is particularly dangerous in conditions of poor visibility and rough terrain and is frequently known to make operation so hazardous as to be prohibitive, with a resultant additional limitation of utility.

These difficulties, inherent in the airplane hitherto, have been overcome in the helicopter by arrangements of operating mechanisms whereby the supporting wings or airfoils are maintained in motion independently of the fuselage, support being thus provided without forward motion of the fuselage or body of the aircraft. All such solutions of the problems of providing maximum utility and safety for aircraft have hitherto failed however of their main objective because wings moving relative to the fuselage have been found in practice to provide only very inferior propulsive characteristics in forward flight. The consequence is that all helicopters, and the like, have been found incapable of flight speeds even remotely comparable to those of airplanes. Since the chief element of utility of any aircraft is its saving of time in transit, the result has been that the helicopter, in spite of its demonstrated superiority in many important phases of performance, has not succeeded in displacing the airplane in any field of application in which it had become established. The helicopter, in fact, has found application only in services in which the airplane is not at all available such as rescue missions in inaccessible places, carrying of mail over short hauls in built-up urban areas, patrol and exploration work, etc.

One object of my invention is to provide an airplane with the moving airfoils of the helicopter so arranged that the advantages of the helicopter in slow speed flight, in take-off and in landing are obtained without material impairment of the forward speed or other performance characteristics of the airplane.

Another object of my invention is to provide an aircraft which may be converted from helicopter performance at take-off to airplane performance in forward flight and conversely from airplane performance to helicopter performance for landing.

Another object of my invention is to effect conversion between the airplane and helicopter phases of performance in such a way that flight remains steady and uniform throughout the conversion.

Another object of my invention is to effect the transition between helicopter and airplane operation in such a way that the attitude of the fuselage is not subjected to any large or sudden changes, which might inure to the inconvenience or alarm of the pilot or passengers, during the conversion.

Another object of my invention is to provide through- out the transition from helicopter to airplane flight automatic maintenance of substantially the maximum efficiency of operation.

Another object of my invention is to provide adequately effective controls for the aircraft in all phases of flight, including any combination of helicopter and airplane flight in which the conversion process might be arrested.

Another object of my invention is to make provision for assuring a safe landing for the aircraft in a small space in case of power failure, regardless of whether it is in helicopter, airplane or transitional flight.

Another object of my invention is to make possible, in an emergency landing of the aircraft, a wider range of choice of landing place than is available to a helicopter and a smaller landing area than has hitherto been safe for an airplane.

Still another object of my invention is to provide an aircraft which shall embody all the advantages of helicopter flight and all the advantages of airplane flight, without material impairment of either.

With the above and other objects in view, which will appear more fully from the following detailed description, my novel construction consists of:

(1) An airplane fuselage and wings;
(2) One or more rotors adapted to function as preponderantly vertically-lifting helicopter rotors or as preponderantly horizontally-propulsive airplane propellers;
(3) One or more power plants adapted to drive said rotor or rotors;
(4) Transmission gearing for driving the rotor or rotors from the power plant, including provision whereby the torque reaction produced by the power plant and transmission is neutralized and therefore does not exert any tendency to impede or assist the tilting of the rotors from the preponderantly lifting helicopter position to the preponderantly propulsive position, or vice versa;
(5) Mechanism under control of the operator for tilting the rotor or rotors to any position between the preponderantly lifting position and the preponderantly propulsive position;
(6) Mechanism for varying the pitch of the rotor or rotors, which mechanism is adapted for manual control and which contains also provision for automatic change of pitch in response to the tilting of the rotor or rotors so as to maintain at all times during the operation of the aircraft a range of rotor pitch adapted to efficient performance;
(7) Rotor control mechanism for controlling the flight of the aircraft as a helicopter with provision for the deactivation of the rotor controls when the aircraft is proceeding as an airplane;
(8) Airplane controls connected in parallel with the rotor controls, said airplane controls being ineffective on account of the low speed of relative airflow over them in the helicopter phase of flight but becoming fully effective in forward flight, thus taking over the functions of the rotor controls as the rotor controls are deactivated by the transitional tilting of the rotor or rotors;
(9) Provision for emeregency landing without power, such as an overrunning clutch in the power transmission system for allowing the rotor or rotors to continue in rotation when the power plant is stopped.

In the accompanying drawings, in which like reference characters indicate like parts, I have illustrated in a general way a form of construction embodying the above structural and functional characteristics, although it is to be understood that the various instrumentalities of which my invenion consists can be variously arranged and organized and that my invention is not limited to the precise arrangement and organization herein described.

Thus.

The fuselage of the aircraft of my novel construction is generally designated by the numeral 25. It may be constructed of any suitable materials and may have the form best adapted to low air resistance in forward flight, in accordance with current practice in the art. It may be provided with cabin space and seats to accommodate the crew in any suitable location within its confines. Any suitable landing gear may be provided in accordance with well known practice in the aircraft art, the said landing gear being preferably retractable for reduction of drag in forward flight.

The fuselage is provided with wings 26 extending laterally from it and rigidly attached so as to form a structurally integral unit with it. Each of the wings 26, in accordance with usual practice, may comprise a contilever type structural spar or spars 27 (Figures 8 and 15) and a light fairing attached thereto completing the desired airfoil contour.

Pivoted to the wings 26 at their outboard trailing edges are the ailerons 28 for rolling control of the aircraft when flying as an airplane.

The fuselage is provided at the tail with a vertical stabilizing fin 29 to which is pivoted the rudder 30 for turning control of the aircraft when operating as an airplane.

Mounted on the vertical fin 29 and rigidly attached thereto is the horizontal stabilizer 31, to which are pivoted the elevators 32. The stabilizer 31 and the elevators 32 may be of conventional form and arrangement, although I have found it advisable to locate them in the rather high position shown in order to minimize interference with the rotor slipstreams when the aircraft is operating as a helicopter.

At the tip of each wing 26 there is mounted a rotor, generally designated by the numeral 33. Each rotor 33 comprises a hub 34 and a number of blades 35 suitably attached thereto. Any number of blades may be used but three blades 35 are shown per rotor since this is the number which I have found most satisfactory in practice.

Figure 4:
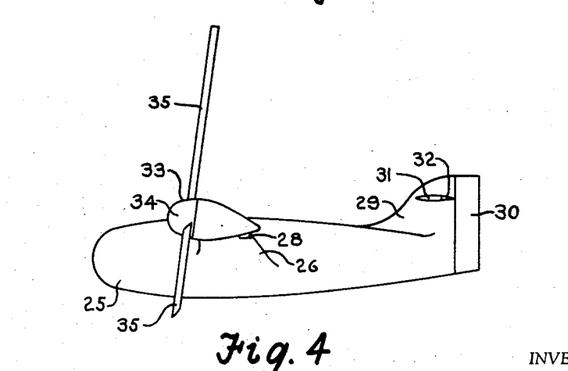
Figure 4 represents a side elevation of the aircraft with the rotors in position for propelling the aircraft in forward flight, corresponding to Figure 2.
Figure 5:
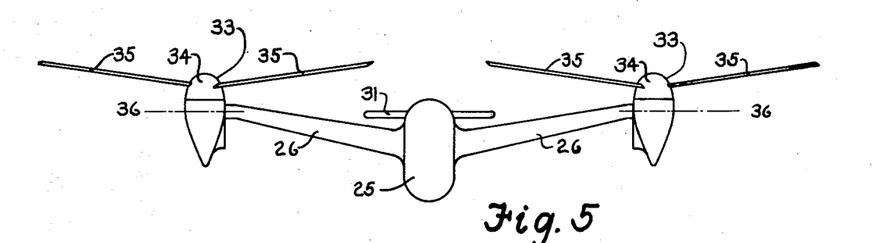
Figure 5 represents a front elevation of the aircraft with the rotors in lifting position, as in Figures 1 and 3.

Each hub 34, shown in Figures 1, 2, 3, 4, 5 and 6 covered with a streamline fairing to reduce drag in forward flight, is pivoted on the tip of the corresponding wing 26 in such a manner, as described more in detail hereinafter, that it may be rotated about the axis 36—36 transverse of the fuselage, so as to tilt the entire rotor 33 from the relative position shown in Figures 1, 3 and 5 to that of Figures 2, 4 and 6. The rotor hubs 34 are so interconnected that they are tilted in unison at all times. The portion of the hub fairing at the end of the hub 33 to which the blades 35 are attached may be arranged to rotate with the blades in the manner of a propeller spinner.

Figure 1:
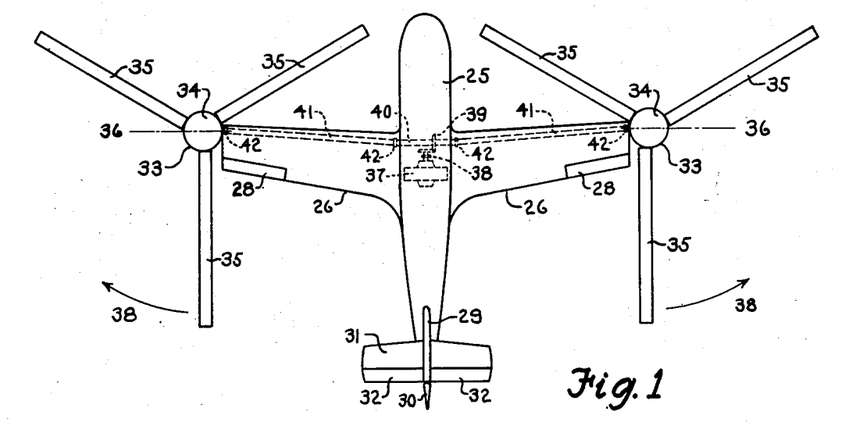
Figure 1 represents a top plan view of an aircraft of my novel construction having two rotors with the rotors shown in position for lifting preponderantly vertically.
Figure 2:
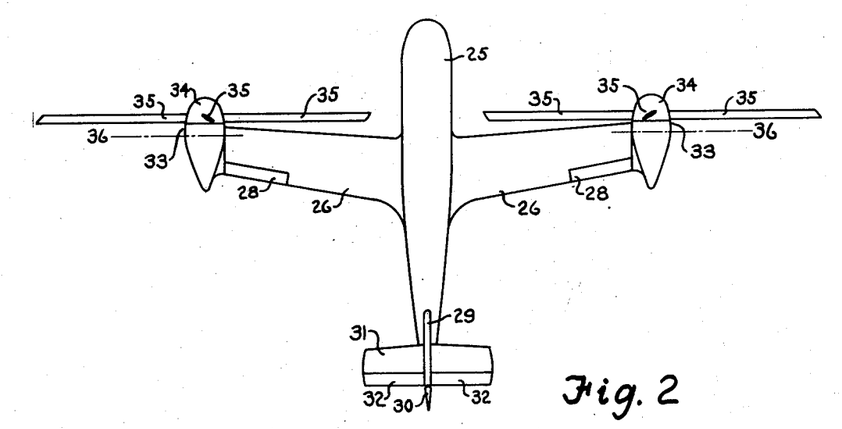
Figure 2 represents a top plan view of the aircraft with the rotors tilted into position for acting preponderantly propulsively.

The rotors 33 are driven, in the aircraft illustrated, by a power plant 37, shown in dotted diagrammatic outline in Figure 1, in the fuselage 25, through the overrunning clutch 38, the bevel gears 39, the drive shaft 40, the two rotor shafts 41 inclosed within the contour of the wings 26, and the universal joints 42, which serve the purpose of permitting the fluctuating shaft disalignments caused by flexure of the wings 26 under the varying loads of flight as well as allowing the wings 26 to be swept angularly forward, as shown, so as to provide clearance for the rotor blades 35 when the rotors are tilted forward to serve as propellers, as shown particularly in Figure 2. The power plant 37 may be of any suitable type, such as for example, a gasoline burning air-cooled engine with radially disposed cylinders. Two or more engines may be substituted outside the fuselage, or other types of prime mover such as gas turbines may be substituted for the engine shown and described above, without departing from the essential of my invention.

Figure 6:
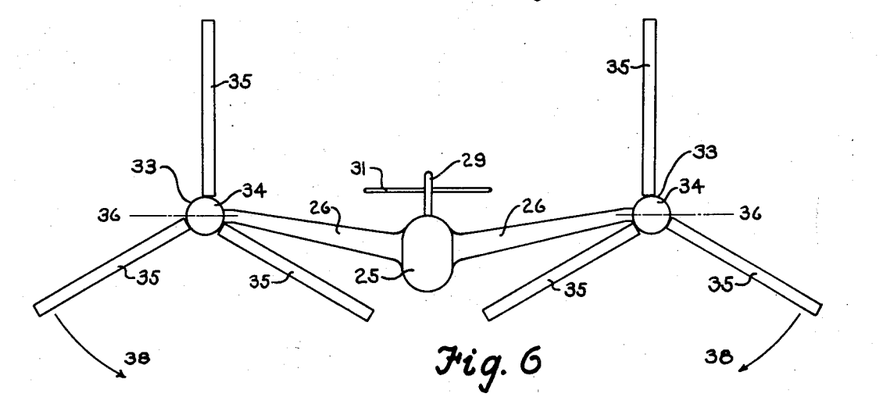
Figure 6 represents a front elevation of the aircraft with the rotors in forward flight position, corresponding to Figures 2 and 4.

The rotors 33 and their driving instrumentalities are preferably so arranged that the tips of the blades 35 move upward as they pass the fuselage 25 when the rotors are acting as airplane propellers, as illustrated particularly in Figures 2 and 6, in accordance with the indication of the arrows 38. The reason for this preference is that the vortex caused by rotation of the rotors is opposed to the wing tip vortices induced by forward flight and the lift efficiency is thereby increased. Rotation in the opposite direction may however be employed without departing from the scope of my invention.

The rotor-tilting mechanism preferred for tiltably mounting the rotors 33 on the tips of the wings 26 is particularly illustrated in Figures 8, 11, 14, 15, 16 and 17. An attachment fitting 43 is bolted to a flange on the outboard end of the cantilever-type wing spar 27. The fitting 43 terminates at its forward end in a circular receptacle 44 which is bored out to receive a tubular hub-supporting member 45. The hub-supporting member 45 is fixed in place in the receptacle 44 by means of the ring nut 46, the spacing sleeve 47 and the inner race of the anti-friction bearing 48. The supporting member 45 is restrained against rotating in the receptacle 44 by a key or pin (not shown). The outboard end of the supporting member 45 is formed with a flange 49 which has at its center a recess bored out to hold the rotor shaft anti-friction bearing 50 and which near its periphery is formed with three recesses containing the planet pinion anti-friction bearings 52. The flange 49 is also drilled and recessed to receive the pinion cage bolts 51 and nuts 53. The pinion cage 54 and the pinion cage end plate 55 are rigidly secured to the flange 49 of the supporting member 45 by the bolts 51 and nuts 53. Thus, when assembled, the cage 54 and the end plate 55 form, together with support 45, a rigid composite member structurally integral with the wing spar 27.

The rotor hub-supporting structure is adapted to be supported by and to be rotatable on the above described composite supporting structure. The said rotor hub-supporting structure comprises four parts rigidly bolted together. These are: the cylindrical transmission case 56, the two halves 57 and 58 of the bevel gear case, and the outboard bearing supporting bracket 59, which is bolted to parts 57 and 58 through lugs not shown. The rotor hub-supporting structure is held in the two anti-friction bearings 48 and 60, the bearing 60 being retained in a suitable recess in the plate 55 and on a seat formed on the bracket 59, being thus free to rotate about the axis 36—36 but otherwise fully confined relative to the supporting member 45.

Rotatably supported in the anti-friction bearings 61, retained in recesses in case members 57 and 58, is the rotor spindle 62 which has integrally formed with it the bevel gear 63 with bevel teeth formed on both its upper and lower surfaces. While the bevel teeth are shown for the sake of simplicity cut directly into the spindle flange, in practice they would be preferably cut on separate rings for facility in hardening and adjustment and the rings would then be bolted to the spindle flange.

Figures 11, 12:
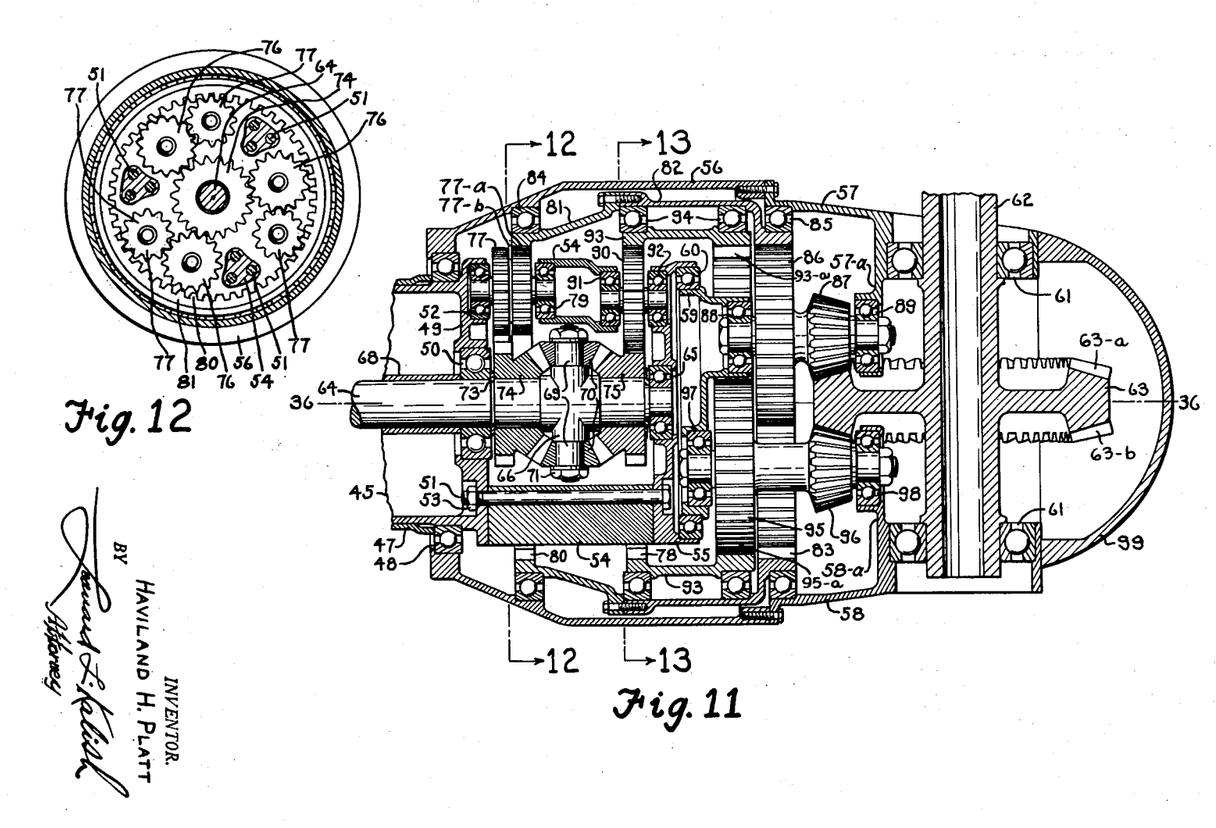
Figure 11 represents a sectional elevation, partly broken away and with the control parts removed, generally on line 11—11, Figure 10, illustrating the rotor transmission gearing.
Figure 12 represents a sectional elevational view, generally on line 12—12, Figure 11, illustrating the arrangement of one of the planetary gear trains of the rotor transmission.
Figure 13:
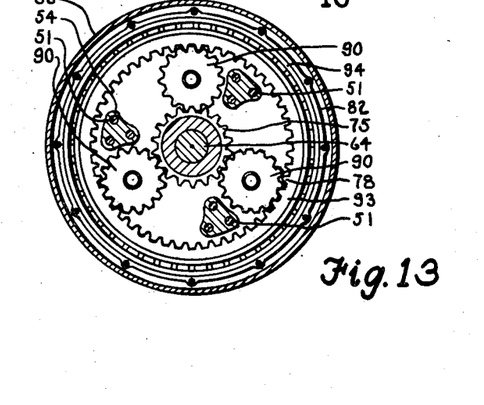
Figure 13 represents a sectional elevation on line 13—13, Figure 11, illustrating the arrangement of the second planetary gear train of the rotor transmission.
Figure 14:
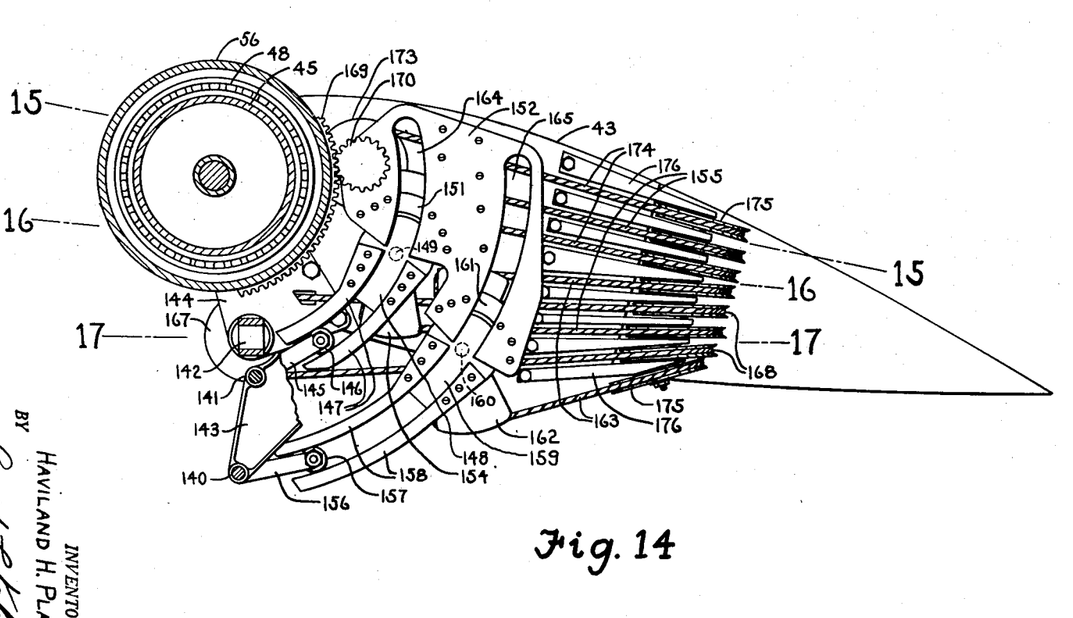
Figure 14 represents a sectional elevational view generally on line 14—14, Figure 8, illustrating particularly the control connections to the rotor.

Each rotor spindle 62 is driven from the rotor shaft 41 through a double planetary gear train, identical for each of the two rotors, contained within the transmission case 56. The driving spindle 64 is rotatably mounted in the anti-friction bearings 50 and 65, the latter being contained in a recess in the pinion cage end plate 55. The spindle 64 has formed adjacent its outboard end the differential driving spider 66 and, on its inboard end, is fitted with splines and screw threads (not shown) for the attachment of the universal joint 42, which is retained in position by the nut 67 (Figure 8), the spacing sleeve 68 (Figure 11) and the split retaining ring 73 (Figure 11). The differential spider 66 comprises two radially-extending studs 69 integral with the driving spindle 64. The studs 69 carry differential bevel pinions 70, which are free to rotate on the studs 69 and are retained by the nuts 71. Rotatably mounted on the spindle 64 are two sun pinion members 74 and 75. Each of the sun pinion members 74 and 75 carries bevel teeth meshing with the bevel teeth of the differential pinions 70 and also carries spur gear teeth; the spur gear teeth of the sun-pinion member 74 meshing with the three planet pinions 76 (see Figure 12) carried in anti-friction bearings (not shown) retained in suitable recesses in the flange 49 and the pinion cage 54. The pinions 76 in turn mesh with the three pinions 77 mounted in the anti-friction bearings 52 and 79, which are also retained in recesses in the flange 49 and the cage 54, respectively. The pinions 77 are wider than the pinions 76 and the portions 77–a of their teeth extending beyond those of pinions 76, separated therefrom by a circumferential groove 77–b, mesh with the internal gear teeth 80 cut in the frusto-conical shell 81. The shell 81 is bolted rigidly to the cylindrical shell 82 which has formed in its outboard end the internal gear teeth 83. The composite shell made up of shells 81 and 82 is rotatably supported in the two anti-friction bearings 84 and 85 of large diameter, which are retained, respectively, in suitable seats in transmission case 56 and split bevel gear case 57 and 58. The internal teeth 83 mesh with the teeth of the pinion 86, which is formed integrally with the bevel pinion 87. The pinions 86 and 87 are rotatably supported by the anti-friction bearings 88 and 89, which are mounted in suitable recesses in the bracket 59 and the flange 57–a of the split bevel gear case 57, respectively.

The spur gear teeth on sun pinion member 75 mesh with those of the planet pinions 90 mounted rotatably in the anti-friction bearings 91 and 92, which are retained in suitable recesses formed in cage 54 and plate 55, respectively. Pinions 90 mesh with internal teeth 78 in the cylindrical shell 93, which is rotatably supported concentrically within shell 82 by the two anti-friction bearings 94 of large diameter retained by shell 82. Internal teeth 93–a in the outboard end of shell 93 mesh with the teeth 95–a of spur pinion 95 which is formed integrally with bevel pinion 96. Pinions 95 and 96 are rotatably supported by anti-friction bearings 97 and 98, which are mounted in suitable recesses in bracket 59 and flange 58–a of the split bevel gear case 58, respectively. The gear case cover 99 is bolted to members 57 and 58 and serves to complete the enclosure of the transmission gearing, to retain lubricating oil and to afford ready access for the servicing and inspection of the gears.

The bevel teeth of the pinions 87 and 96 mesh with the teeth 63–a and 63–b, respectively, cut on the opposite sides of bevel gear 63, pinion 87 meshing with the teeth on the upper side and pinion 96 with those on the lower side, thus completing the gear drive trains from the driving spindle 64 to the driven rotor spindle 62. It may be noted that the differential assembly carried by spindle 64, comprising spider 66, pinions 70 and pinion members 74 and 75, can transmit only equal forces, on account of the fact that said forces are balanced against each other through the differential pinions 70, to the planet pinions 77 on the one hand and 90 on the other hand. Since the ratios of mechanical advantage are equal for the two complete gear trains, it follows that the forces exerted by the bevel pinions 87 and 96 on bevel gear 63 are equal also. The only forces which react on the hub case so as to tend to tilt the rotor spindle 62 about the axis 36—36 are the reaction forces transmitted to the case members 57 and 58 through the pinion bearings 88, 89, 97 and 98. These reaction forces being opposite and equal on both sides of gear 63, because of the equal forces exerted by pinions 87 and 96, the tendency to tilt the rotor in one direction is at all times balanced by a tendency to tilt it in the other direction. Thus, it is seen, by virtue of my novel construction, transmission of power from the rotor shafts to the rotor spindles produces no direct tendency to tilt the rotors. With previously known forms of transmission for driving rotors, the torque tending to tilt the rotors, when considerable power is being transmitted, is so great as seriously to interfere with tilting the rotors by manual effort.

Other advantages of my novel transmission are: 1, reduction of the size of the rotor spindle bevel gear 63, since part of the necessary speed reduction takes place in the planetary gear trains; 2, all end thrust on the rotor spindle bearings 61 due to driving forces is eliminated, due to the balance of the thrusts from pinions 87 and 96, with consequent gain in reliability and reduction in weight of the bearings and structural parts; 3, reduction in the width of the gear faces of pinions 87 and 96 and of gear 63 over that which would be required with a single drive contact, resulting in lower weight and greater reliability in service.

The rotor head 100 is fitted with internal splines which engage splines on the upper end of rotor spindle 62. A nut 101 screwed onto threads on the end of spindle 62 co-axially secures the head 100 to the spindle 62. The three blade stubs 102 are pivotally mounted, by means of the pivot pins 103, in suitable lugs on the rotor head 100. The permitted range of rotation of the stubs 102 about the pins 103 is established by the flap stops 104. The outboard ends of the stubs 102 are adapted to accommodate generally vertically disposed lag pivots 105 about which the blade pitch bearing spindles 108 are free to swing between suitable limits. The blade pitch bearing housings 106 are mounted on the spindles 108 through suitable anti-friction bearings with freedom to rotate about them but with complete restraint in the radial direction. The blade root fittings 107 are bolted securely in the bearing housings 106 and the airfoil blades 35 are supported in fixed relation to the root end fittings 107 by clamping, welding or any of the other means well known in the helicopter rotor art. The pitch horns 109 are securely bolted to the housings 106 at one end and terminate at the other end in ball fittings. The hydraulic friction dampers 110 are pivotally connected between the brackets 111 and 112, which are securely attached to bearing spindles 108 and the stubs 102, respectively, for the purpose of imposing frictional restraint on the blade lagging motions, as is well known in the helicopter art.

Figure 7:
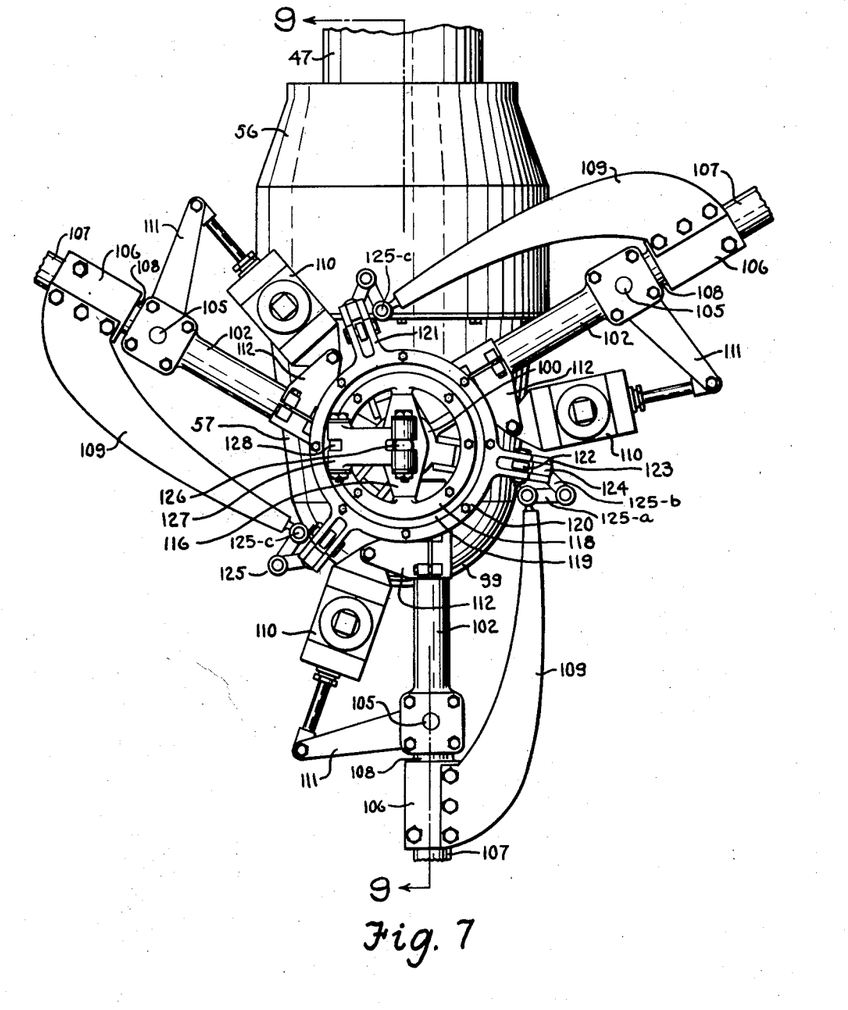
Figures 7 represents a plan view to a larger scale of the hub of one of the rotors with the fairing removed and the blades broken away.

Control of rotor blade pitch is achieved by imparting vertical displacement motions to the ball end fittings of the pitch horns 109. Each of the pitch horns 109 is a rigid element bolted to the housing 106 and rotatable along with the blade root fitting 107 of the associated rotor-blade. Movement of the ball end fitting vertically (out of the plane of the paper upon which Figure 7 is illustrated) imparts a rotary motion to the associated rotor blade; the ball end fitting rotating around the axis of the blade with a moment-arm equal to the horizontal distance between the axis of the blade and the center of the ball end fitting of the pitch horn 109. If the end fittings are all raised in unison the pitch angles of all three blades of a rotor are simultaneously altered by the same amount and a collective pitch change of the rotor is the result. If the horn end fittings are alternately raised and lowered as the rotor turns, then the result is a cyclic variation of pitch of each blade as it revolves about the rotor spindle axis. The control mechanism of my novel construction makes provision for achieving both the above types of pitch variation, as required by the various phases of flight to which the aircraft is adapted. In carrying out these objectives I provide, coaxially within but not in contact with the tubular rotor spindle 62, the pitch control tube 113. Tube 113 is non-rotatably supported at its lower end with relation to the gear case member 58 by means which will be more fully described hereinafter and is maintained in coaxial relationship with spindle 62 by the anti-friction bearing 114 which is retained in a recess in the spindle nut 101 by the cap nut 115. The rotor spindle 62 and the rotor head 100 are thus free to rotate about tube 113 with a minimum amount of drag on said tube. The pitch control tube 113 is slidably fitted in the inner race of bearing 114 and, rigidly attached to it at its upper end, is the swash-plate pivot block 116 which has formed on it at opposite sides of tube 113 the two pivots 117. Mounted on pivots 117, to tilt about them, is the split swash-plate inner ring 118, which retains, at its outer periphery, the inner race of the swash-plate anti-friction bearing 119. The outer race of the bearing 119 supports in integral relationship the swash-plate outer ring 120. Integrally formed on ring 120 are the three pairs of attachment lugs 121 which are operatively connected to the ball ends of the pitch horns 109 by parallel motion linkage comprising the swash-plate links 122, the arms 123 which are pivoted at their inner ends to the rotor head 100, the connecting links 124 which are adjustable in length for individual blade-pitch adjustment, and the door-hinge members 125–a and 125–b, the outer one 125–a of which terminates in a spherical fitting 125–c for universally retaining the ball ends of the pitch horns 109. The swash-plate links 122 are attached to lugs 121 through spherical seated pivots to allow the requisite angular motions which occur during rotation when the swash-plate assembly is angularly displaced from the horizontal.

Slidably fitting within the pitch tube 113 and fixed against rotation relative thereto at its lower end, as will be described more fully hereinafter, is the cyclic control rod 126. The link 127 is pivotally attached at its upper end to the top of rod 126 and at its lower end to the eye-bolt 128 on the swash-plate inner ring 118. It is readily seen that, by virtue of the above described disposition of parts, a vertical displacement of tube 113 and rod 126 in unison causes a collective pitch change of all three blades of the rotor, while a motion of rod 126 with relation to tube 113 tilts the swash-plate and so produces cyclic pitch change of the rotor blades as they move around the spindle axis.

Figure 8:
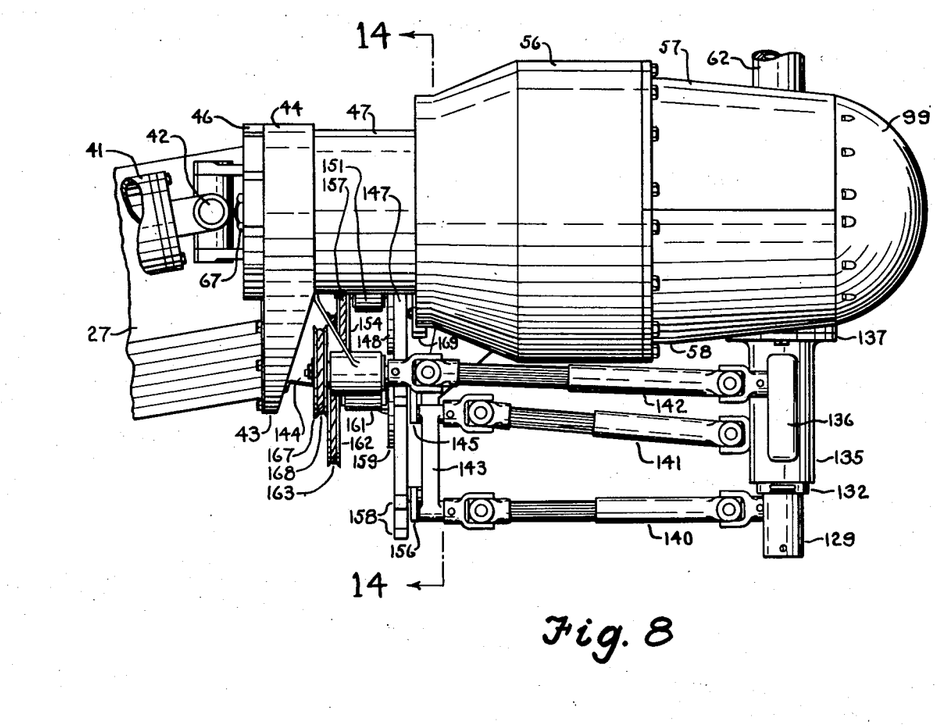
Figure 8 represents an elevational view of the hub shown in Figure 7, particularly illustrating the rotor control, differential pitch control and collective pitch control connections, the rotor being broken away.
Figure 9:
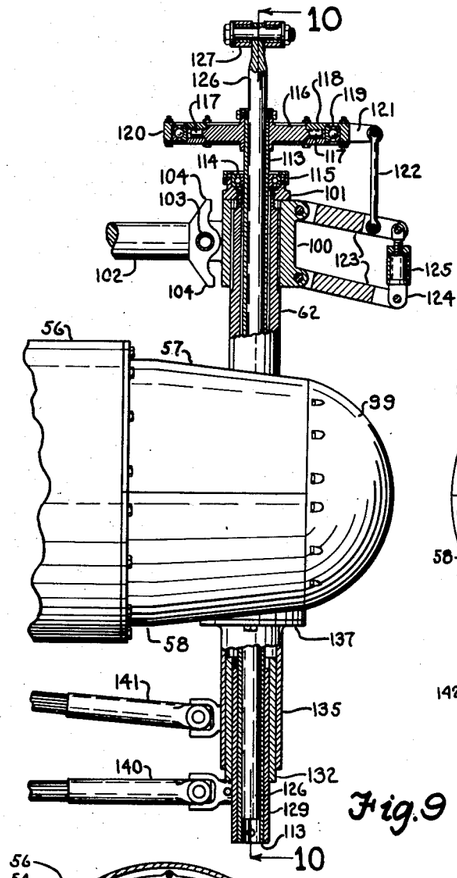
Figure 9 represents a fragmentary elevational view, partly sectioned generally on the line 9—9, Figure 7, of the hub and rotor, particularly illustrating the rotor, differential pitch and collective pitch controls.
Figure 10:
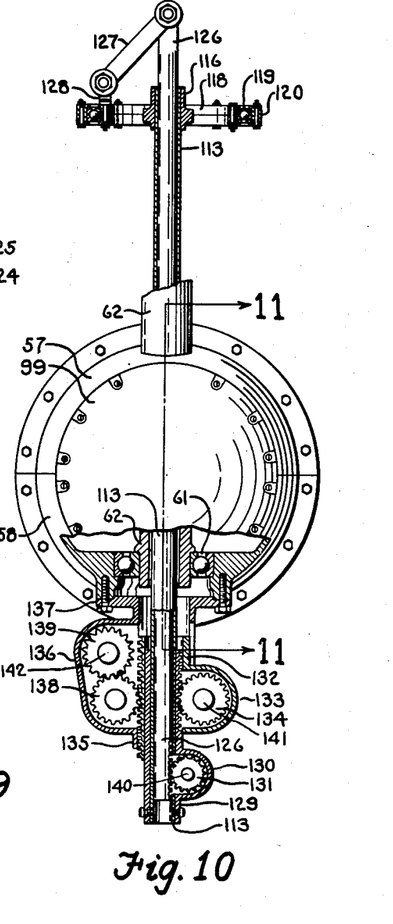
Figure 10 represents an end elevational view of the hub without the rotor, partly sectioned generally on the line 10—10, Figure 9.

The mechanisms provided in my novel construction for actuating the pitch and cyclic control parts are illustrated particularly in the lower portions of Figures 8, 9 and 10. The pitch tube 113 is rigidly secured at its lower end to the sleeve 129, which is formed with a recess 130 on one side near its lower end and rack teeth cut on the same side adjacent its upper end. A pinion 131 is rotatably supported in the recess 130, its teeth engaging the rack teeth cut in one side of the cyclic control rod 126 adjacent its lower end. Sleeve 129 is slidably mounted in a second sleeve 132, which is formed with a pinion recess 133 on one side and rack teeth cut in its other side. A pinion 134 is rotatably supported in the recess 133 with its teeth engaging the rack teeth on sleeve 129. Sleeve 132 is in turn slidably mounted in the cylindrical case 135, which is formed with a pinion recess 136 on one side, a slot for accommodating pinion recesses 133 and 130, and a flange 137 at its upper end which is securely bolted to a suitable pad on gear case member 58. Rotatably supported in recess 136 are the two intermeshing pinions 138 and 139, the teeth of pinion 138 meshing with the rack teeth of sleeve 132. The function of pinion 139 is primarily that of reversing the direction of rotation of the pinion 138 and the direction of travel of the sleeve 132. Sleeve 132 is restrained against rotation by the engagement of its rack teeth with pinion 138. Similarly sleeve 129 is prevented from turning by the contact between its rack teeth and pinion 134, and rod 126 is likewise restrained from rotating by pinion 131.

It is now apparent that rotation of pinion 131 alone causes only cyclic pitch actuation of the rotor blades, while rotation of pinion 134 alone or pinion 139 alone causes only collective pitch change of the rotor.

Actuation of the three control pinions 131, 134 and 139 is achieved by means of three extensible, universally jointed control shafts 140, 141 and 142, respectively. The inboard ends of shafts 140 and 141 are supported in bearings in the bracket 143 which is rigidly attached to transmission case 56. Shaft 142 however is supported at its inboard end in a bearing in the bracket 144, which is fixed to the wing attachment fitting 43.

Figure 15:
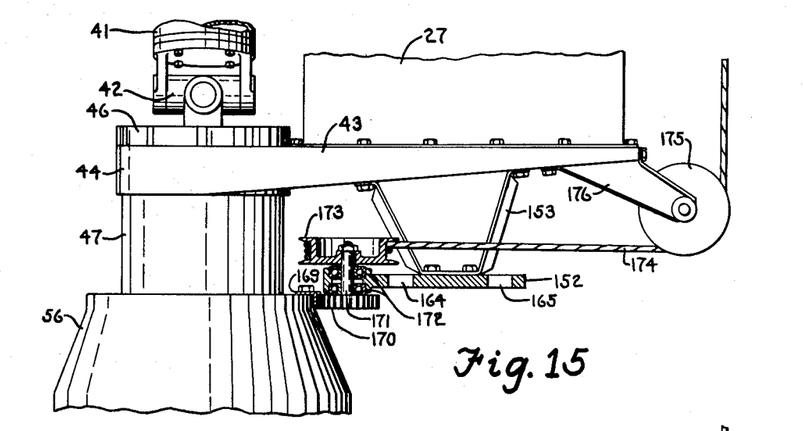
Figure 15 represents a plan view of the inboard portion of the rotor hub, partly sectioned generally on line 15—15, Figure 14, illustrating particularly the hub attachment means and the arrangement of the rotor tilt control mechanism.
Figure 16:
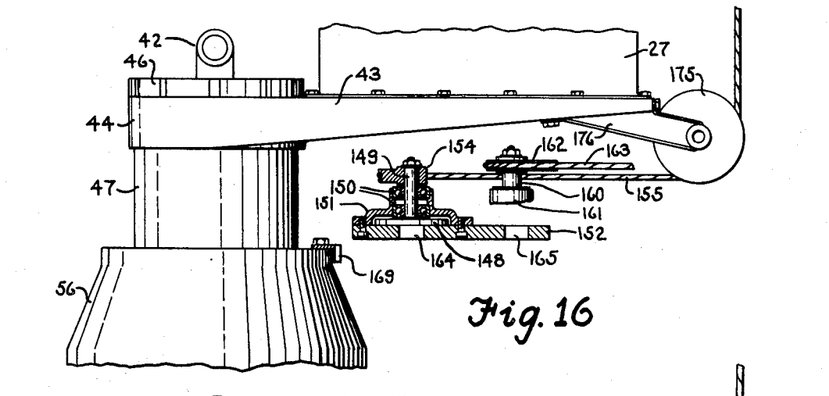
Figure 16 represents a fragmentary plan view of the inboard portion of the rotor hub, partly sectioned generally on the line 16—16, Figure 14, illustrating particularly the arrangement of the rotor control and the differential pitch control connections.
Figure 17:
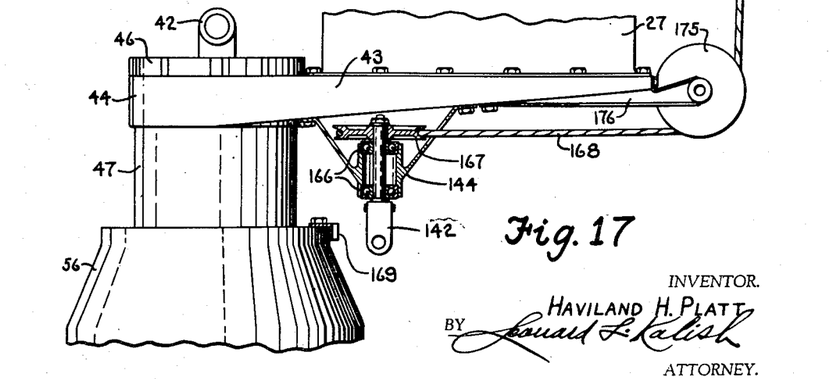
Figure 17 represents a fragmentary plan view of the inboard portion of the rotor hub, partly sectioned generally on line 17—17, Figure 14, with the parts somewhat displaced for clarity of representation, illustrating particularly the arrangement of the collective pitch control connections.

Solidly attached to the inboard end of the shaft 141 is the lever arm 145, the end of which carries an offset roller 146, which is adapted to engage the slot bounded by the control fingers 147. Fingers 147 are attached by bolting, riveting or integral machining to a flange 148 formed on the end of a short shaft 149. Shaft 149 is rotatably supported in anti-friction bearings 150 contained in suitable recesses in the bracket 151 bolted to the bearing plate 152. Bearing plate 152 is supported in fixed relationship to the wing fitting 43 by suitable brackets, one of which is shown in Figure 15 and designated 153. Shaft 149 is operationally integral with a cable pulley segment 154 having grooves in its two lobes, said grooves serving to guide a control cable 155, which is secured to pulley segment 154 (as by welding, clipping, etc., not shown) to prevent slipping.

Similarly, shaft 140 is operationally integral with the lever 156 carrying offset roller 157 engaging the slot between the fingers 158. Fingers 158 are secured to flange 159 on shaft 160 supported in anti-friction bearings in the bracket 161 bolted to bearing plate 152, the arrangement being similar to that for shaft 149. Shaft 160 carries the pulley segment 162 having peripheral grooves for receiving the cable 163, which is secured to pulley segment 162 (as by welding, clipping, etc., not shown) to prevent slipping.

Bearing plate 152 has arcuate slots 164 and 165 cut in it. Slots 164 and 165 are adapted to receive rollers 146 and 157, respectively, and to function as extensions or continuations of the slots between fingers 147 and between fingers 158.

The control shaft 142 is rotatably supported adjacent its inboard end in the anti-friction bearings 166, mounted in bracket 144, and has integrally attached thereto inboard of said bearings 166, the cable pulley 167, which is grooved to receive the control cable 168; cable 168 being attached to pulley 167 (as by welding, clipping, etc., not shown) to prevent slipping.

A spur gear segment 169 is bolted to the transmission case 56 and meshes with the tilt control pinion 170. Pinion 170 is integral with shaft 171, mounted in anti-friction bearings 172, which are supported in a suitable recess in the plate 152. Secured to the end of shaft 171 is the pulley 173, which has a wide peripheral groove capable of receiving several turns of the cable 174, attached at one point to pulley 173 (as by welding, clipping, etc., not shown) to prevent slipping.

All eight strands of control cables 163, 168, 155 and 174 extend to the rear of the wing fitting 43 where they pass over suitable guide pulleys 175 supported in suitable bearings mounted on brackets 176 bolted to said wing fitting 43. The brackets 176 are individually spaced, angled and extended to provide clearance and suitable lead alignment for the various control cables. The control arrangement for the other hub, which is not shown, is the same as that shown with the exception that the disposition on one side is the mirror image of that on the other side.

From the guide pulleys 175 the control cables extend, within the wing contour, along the rear wall of the wing spar 27 to the fuselage and the cockpit, where they are attached to the cockpit control instrumentalities, to be described more fully hereinafter. Suitable additional guides and pulleys, not shown, are provided to assure freedom and correct alignment for said cables between the wing tip and the cockpit, in accordance with the practice well known in the aircraft art.

Figure 18:
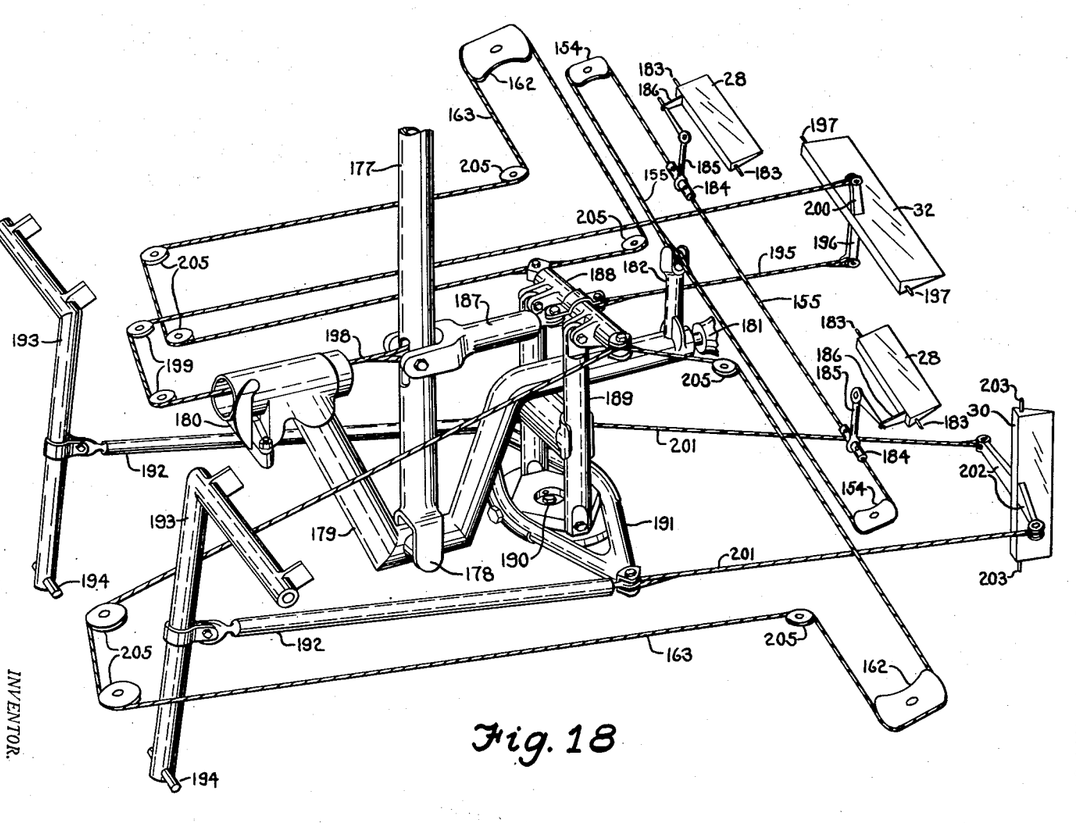
Figure 18 represents a diagrammatic perspective view of the flight control instrumentalities in the cockpit of the aircraft, together with their connections to the several rotor and airplane controls.

The arrangement of the flight control instrumentalities in the cockpit, as they are embodied in a form of my novel construction, are illustrated in the diagrammatic perspective view of Figure 18. The pilot's control stick, or "joy stick," shown broken away, is designated by the numeral 177. The stick 177 is pivoted at 178, for fore and aft angular motion, to the bent tube 179. Tube 179 is rotatably supported at 180 and 181 in suitable bearings (not shown) mounted on the aircraft structure. Adjacent the rear end of tube 179 is affixed the lever arm 182, to which the ends of the differential pitch control cable 155 are pivotally attached. Cable 155 is arranged to actuate, in addition to pulley segments 154, the two ailerons 28 in angular displacement about pivots 183, through the intermediacy of thimbles 184 secured to cable 155, bell crank levers 185 and levers 186.

Pivoted to control stick 177 at a point slightly above the pivot axis of tube 179 is the link 187, which is universally pivoted to the cross arm 188. Arm 188 is in turn pivoted to the two arms of yoke 189, which is universally pivoted to the aircraft structure at 190. Securely attached to the lower end of yoke 189 is the diamond frame 191. The ends of frame 191 carry universal pivots to which are connected push-pull rods 192, the other ends of which are similarly attached to the rudder pedals 193, said rudder pedals being pivotally mounted at 194 on the aircraft structure for fore and aft angular displacement. Pivotally attached at the center of the cross arm 188 is the cable 195, which extends through suitable guides, not shown, to the tail of the aircraft where it is attached, through horn 196, to elevator 32 (for simplicity shown as a continuous airfoil in Figure 18) which is mounted on the tail structure for swinging about pivots 197. Similarly attached at the front end of link 187 is the cable 198, which is led over guide pulleys 199 and, through other suitable guides not shown, to the other horn 200 of the elevator 32. In a similar manner the cables 201 connect the ends of the diamond frame 191 to the horns 202 of the rudder 30, which is pivoted to the tail structure at 203. Likewise, cables 163 extend from the ends of cross arm 188 around longitudinal control pulley segments 162, passing over guide pulleys 205 as well as other suitable guiding means including pulleys 175, shown in Figures 14 and 16 but not in Figure 18. The pilot's seat (not shown) may be placed a convenient distance behind stick 177 so that the pilot, when seated in it, has the stick 177 within convenient reach of his hand and pedals 193 suitably disposed for operation by his feet. The entire control mechanism may be placed below the cockpit floor level so that only the upper parts of the stick 177 and the pedals 193 project above that level.

Figure 19:
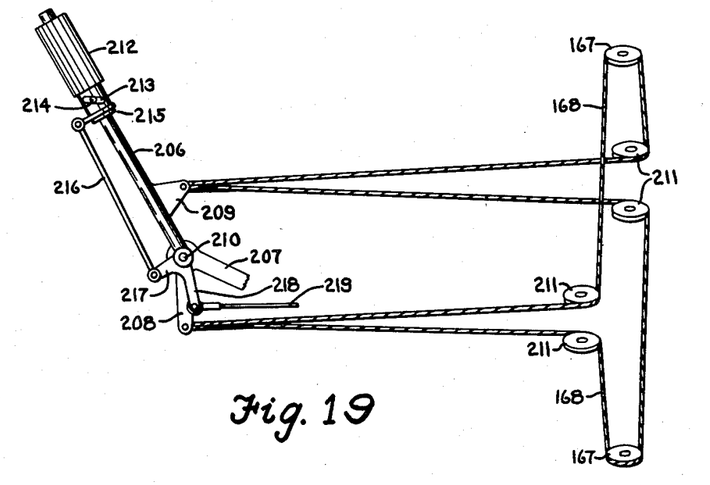
Figure 19 represents a diagrammatic view of the collective pitch and throttle control instrumentalities in the cockpit together with the connections of the former with the rotors.

The cockpit collective pitch control mechanism is illustrated in diagrammatic elevation and perspective in Figure 19. The pitch control lever 206 is pivotally mounted at 210 on a structural member 207 for angular displacement in a fore and aft vertical plane. Operationally integral with lever 206 is the shorter lever 208 and the lug 209. The cables 168 are each pivotally secured at one end to lug 209, and at the other end to lever 208. Each cable 168 passes out along the cantilever-type wing spar 27, around a guide pulley 175, around pitch control pulley 167, around a second guide pulley 175 and back again. Additional suitable guiding means (not shown) is also provided, including guide pulleys 211. A throttle control for controlling the power plant 37 may be associated with the collective pitch control lever 206, as shown in Figure 19. For this purpose a hand grip 212 may be rotatably mounted on lever 206. The angled slot 213, in cooperation with the pin 214, may be provided to cause axial sliding of the sleeve 215 along the lever 206 in response to rotation of the hand grip 212. The motion of the sleeve 215 actuates rod 216 and, through it, bell crank arm 217, which is pivoted coaxially with lever 206. The other arm 218 of the bell crank is connected to the rod 219, which is, through suitable intermediate levers and rods, operationally connected to the throttle of power plant 37. Hand grip 212 is preferably located at the side of the cockpit within convenient reach of the pilot's seat.

Figure 20:
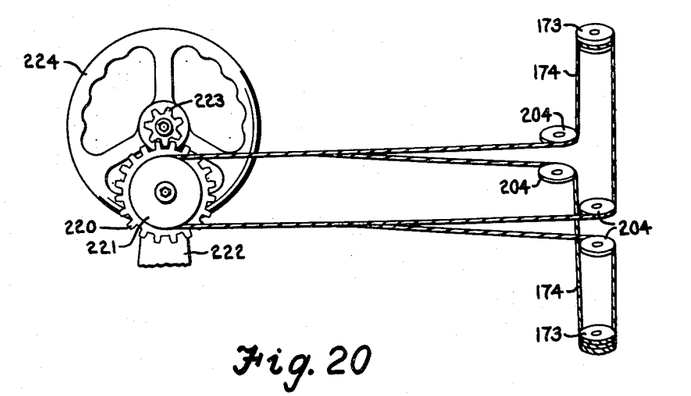
Figure 20 represents a diagrammatic view of the rotor tilt control instrumentalities in the cockpit together with their connections to the rotors.

An arrangement for providing manual actuation of the tilting of the rotors is illustrated in diagrammatic elevation and perspective in Figure 20. A spur gear 220, integral with a cable drum 221, is mounted with rotational freedom on a suitably located structural support 222. Similarly supported and meshing with gear 220 is pinion 223, rotationally integral with hand wheel 224. One of the tilt control cables 174 passes around drum 221, being attached thereto to prevent slipping, around guide pulleys 175, tilt control pulleys 173 and suitable intermediate guiding means, including the guide pulleys 204. The other cable 174 is spliced to the first and follows a similar path, so that the two control pulleys 173 are actuated in unison when the hand wheel 224 is turned. Hand wheel 224 is located at the side of the cockpit within convenient reach of the pilot.

Figure 3:
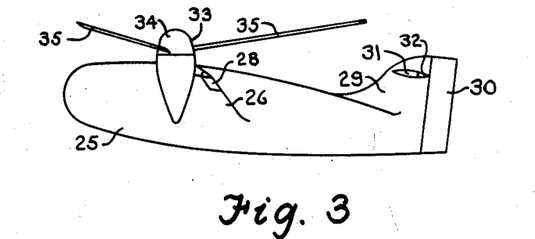
Figure 3 represents a side elevation with the rotors in the lifting attitude, corresponding to Figure 1.

In operation, for a normal take-off, the rotors 33 are disposed with their axes substantially vertical, as in Figure 3. With the power plant running, the rotors are turning in opposite directions with equal speeds. The aircraft is then lifted vertically from the ground through the pulling back of the collective pitch and throttle lever 206, which motion simultaneously increases the collective rotor pitch of both rotors by displacing cables 168 so as to rotate pulleys 167 and thereby to rotate control pinions 139 and 138, raising swash-plate ring 116 and control rod 126 in unison in both rotors, and increases the power output by throttle actuation sufficiently to overcome the increased air resistance caused by the greater rotor pitch. After the aircraft has left the ground, control of altitude of the aircraft and speed of revolution of the rotors is maintained by manipulation of pitch control lever 206 and rotation of the hand grip 212, any combination of pitch and throttle being thereby readily available.

Lateral and longitudinal control of the aircraft, while it is flying as a helicopter, are effected in conventional manner. Moving control stick 177 forward causes the aircraft to go forward and moving it backward causes slowing down or flying backwards. For lateral balance or for flying sideways the control stick is moved to the corresponding side. For turning, the rudder pedals are employed by depressing the one on the side toward which the turn is to be made. Following through the motions, it is seen that moving the stick forward actuates both cables 163 and rotates rotor control pulleys 162, thus raising rollers 157, turning shafts 140 and pinions 131, thereby lowering rods 126 with relation to swash-plate blocks 116 and causing cyclic actuation of blade pitch changes in the two rotors at once in an azimuthal relationship such as to cause forward inclination of the force vectors of both rotors in equal amounts. Moving the stick to the side actuates cable 155 and turns the two differential pitch control pulleys 154 in opposite directions relative to their respective hubs, thereby raising roller 146 in one rotor and depressing it in the other. Shafts 141 and pinions 134 are thus differentially actuated in similar manner, with the consequence that swash-plate block 116 and control rod 126 are lifted in one rotor and depressed in the other rotor, thus causing an increase in collective pitch in one rotor and a decrease in the other. The final result is a decreased lifting force on one side and an increased lifting force on the other side. Depressing one rudder pedal 193 relative to the other causes rotation of yoke 189 about a generally upright axis, the two cables 163 and the cyclic pitch control pulleys 162 being thereby differentially actuated, cyclic pitch changes in the rotors consequently ensuing such as to direct the force vectors forward in one rotor and rearward in the other to provide a turning couple in the required direction. It may be noted that the parallel motion linkage connecting the swash-plate ring 120 to the blade pitch horns 109 serves the purpose of making the pitch of the blades substantially unaffected by either flapping about pivots 103 or lagging about pivots 105.

In addition to the movement of the apparatus resulting from the control displacements described above, moving control stick 177 fore and aft actuates the elevator 32 through cables 195 and 198 and horns 196 and 200. Also moving stick 177 laterally actuates ailerons 28 differentially through cable 155 and bell cranks 185. Similarly, operating rudder pedals 193 actuates rudder 30 through rods 192, cables 201 and horns 202. When the aircraft is operating at slow speed as a helicopter, however, the relative airflow over the elevator, ailerons and rudder is at so low a velocity that they are substantially ineffective.

When the pilot desires to proceed to a destination, the control stick is moved forward and the aircraft assumes forward flight, at first in the common manner of a helicopter, the rotor axes remaining only slightly inclined from an upright position. When a forward speed toward the upper limit of the helicopter speed range is attained, conversion from helicopter flight to airplane flight is commenced. For this purpose the pilot grasps the hand wheel 224 and rotates it. The rotation of the hand wheel 224 is conveyed through the reducing gears 223 and 220 to actuate cables 174, which in turn rotate the tilt control pulleys 173, the pinions 170 and the rotor transmission cases 56 in unison on both sides of the aircraft. The forward component of thrust of the rotors 33 is thereby increased and the vertical component of thrust decreased. This would result in a loss of altitude if it were not that the forward speed of the aircraft has now attained a value sufficient to make effective the fixed wings 26 and the elevator, ailerons and rudder. An attitude may therefore be maintained, by customary airplane control, such as to provide as much lift on the wings as is lost by the rotors.

If the helicopter controls were to remain effective when the rotors are tilted into the propeller position the responses would no longer be correct for control of the aircraft as an airplane. To avoid this difficulty, the rotor flight control instrumentalities of my novel construction are so arranged that they become ineffective as the rotors are tilted forward. This result is achieved by the arrangement, shown in the drawings and described hereinbefore, whereby the inboard bearings of the control shafts 140 and 141 are mounted wholly on the hub case 56 and therefore rotate with it. The rollers 146 and 157 are carried with the shaft bearings as they turn about the drive shaft axis 36—36. Thus, it is seen, as the forward tilt of the rotors proceeds, the rollers 146 and 157 move in the arcuate slots formed by the control fingers 147 and 158 to positions closer to the axes of the control shafts 149 and 160, thereby reducing the effectiveness of rotational motions of said control shafts. When the tilting displacement has proceeded to the angle at which rollers 146 and 157 reach said shaft axes rotational motion of said shafts will have no further effect on rotor pitch. With further tilt the rollers 146 and 157 pass into the fixed slots 164 and 165, remaining ineffective throughout the balance of the rotor tilt range. By suitable proportioning of the parts the immobilization of the helicopter flight controls is caused to take place at such a point in the transition that the airplane controls are fully effective, on the one hand, and the helicopter controls are still adequate, on the other hand. As the tilting of the rotors is continued beyond the point of complete elimination of the helicopter controls, flight is guided by means of the airplane controls in the manner customary in the airplane art.

When the rotor axes are tilted to a generally horizontal attitude, further power may be applied so as to attain the higher forward speed available with the rotors acting as airplane propellers. An additional action takes place as the rotors are tilted forward. Since the inboard bearing of the collective pitch control shaft 142 is mounted on the wing structure, rotation of the rotor hub case 56 causes a corresponding rotation of shaft 142 relative to said case. Collective pitch control pinions 139 and 138 are thereby actuated and the collective pitch of both rotors is changed, the change being, for the arrangement shown, an increase of collective rotor pitch with forward rotor tilt. By this novel construction, therefore, the collective pitch of both rotors is caused to increase automatically with forward rotor tilt without manual actuation of the collective pitch lever. The larger pitch angle required for efficient operation of the rotors when acting as airplane propellers, over that required when they are acting as helicopter lift rotors, is thus effected.

Throughout the transition and forward flight ranges the pitch and throttle controls 206 and 212 remain available to the pilot for use in adjusting the speed and power output of the power plant to suit the flight condition desired. Likewise, with suitable proportioning and manipulation of the various control and trimming instrumentalities available, flight may be maintained in a steady, fully controllable state with the rotor axes tilted to any intermediate angle between their true helicopter position of general verticality and their true airplane position of general horizontality.

When it is desired to slow down and land, the above described process is reversed by first reducing speed through combined throttle and collective pitch manipulation, then actuating the rotor tilt control to bring the rotor axes gradually into a generally upright position, slowing down still further by means of the helicopter type controls and then landing vertically or with slight forward velocity, as is customary with helicopters.

My novel aircraft is well adapted for emergency landing in case of power failure. If power fails while it is flying as a helicopter the landing procedure is the same as that of the conventional helicopter. If the failure takes place during airplane flight the aircraft first continues its forward motion in a glide as an airplane, the fixed wings furnishing the support and the overrunning clutch 38 permitting the rotors to "windmill" freely. As the chosen landing place is approached, the rotor tilt mechanism is actuated to swing the rotor axes back toward the vertical. In the transition from airplane gliding flight to helicopter autorotative descent there is a difference from the corresponding transition between power-on airplane flight and power-on helicopter flight in that, in the latter case, the air continues to flow through the rotor discs in the same relative direction throughout, while in the power-off condition the air initially passes into the rotor from the side away from the wing and at some time during the conversion there must be a change to a flow in the opposite relative direction. It has been ascertained however that this reversal of relative airflow may be effected without material hazard or inconvenience by the expedient of executing a "pull-up" at the critical point where the shift becomes necessary, that is by simply pulling back the control stick while the airplane controls are still effective, thus elevating the nose of the craft sufficiently to move the relative air incidence from the upper to the lower sides of the rotor discs. The landing procedure is thereafter that of a conventional helicopter.

The type of emergency landing thus made available by novel construction is more advantageous than that available either to the airplane or to the helicopter for the reason that the gliding angle when disposed as an airplane is much smaller than that of a helicopter. A greater area is therefore available in which to choose a landing place. As the chosen spot is approached, then, the conversion is made and a landing may be effected in a far smaller clear space than would be possible with an airplane.

I am aware that deviations from the specific control arrangements shown are possible. Thus, for example, the longitudinal and steering control function may make use of the rotor tilting mechanism without recourse to cyclic pitch variation, the latter arrangement being at present preferred by me chiefly because it involves the displacement of only light parts and is therefore better adapted for the rapid motions which may be necessary in controlling the aircraft. In order to avoid confusion in control terminology I use herein the following definitions relating to control mechanisms in the aircraft of my present invention:

The term "rotor controls" refers to any mechanism adapted to place in control of the operator the inclination of the thrust vectors of the individual rotors.

The term "differential pitch controls" refers to any mechanism adapted to increase and decrease simultaneously and oppositely the collective pitches of two or more rotors for control purposes.

The term "collective pitch controls" refers to any mechanism adapted to vary the pitch angles of all the blades of all the rotors of the aircraft generally in unison.

I am also aware that forms of control actuation other than the pulley and cable systems shown herein, such as for example push-pull rod, shafting and gearing, pneumatic or hydraulic systems, may be employed without departing from the essential nature of my invention.

I am aware also that other power and rotor drive provisions may be employed than those shown and described hereinbefore, such as jet propulsion of the rotor blades. In such an eventuality those portions of the present description which apply to power plant and transmission features may be ignored, without however any impairment to the novelty or efficiency of the remaining features of my construction.

For the sake of simplicity in presentation no landing gear is shown in the drawings. It is to be understood that a landing gear of the retractable type is employed in order to minimize air drag when flying as an airplane and that the drawings all illustrate flight with said landing gear fully retracted. The landing gear may be constructed in accordance with any of the forms well known in the airplane art. Also the wings 26 are shown without trailing edge flaps, or other devices for increasing their lift at low speed, such as are known in the airplane art. It is foreseen that such devices may prove to be advantageous in facilitating the transition between helicopter and airplane flight and they may be added without departing from the essence of my invention.

The rotor blades 35 are, for simplicity, illustrated as being flat and of rectangular plan form. In practice it is preferable to form them with a twist, that is with greater pitch at the roots than at the tips, and with a tapering plan form. Such modifications, being well known in the airplane and helicopter arts, may be made without departure from the essentials of my invention.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I claim as new and desire to secure by Letters Patent is:

1. In an aircraft having a wing extending beyond each side of a fuselage, a rotor tiltably mounted on each of said wings, rotor controls operatively connected to said rotors and constructed and arranged to adjust the rotors and to vary the inclinations of the thrust vectors of said rotors differentially between the two rotors, rotor-tilting mechanism operatively connected to said rotors and constructed and arranged to tilt said rotors in unison between preponderantly lifting positions and preponderantly propulsive positioins, and deactivating mechanism interlinking said differential thrust-vector controls with the said rotor-tilting mechanism whereby the effectiveness of said differential thrust-vector controls is reduced as said rotors are tilted toward their preponderantly propulsive positions.

2. In an aircraft having a wing extending beyond each side of a fuselage, a rotor tiltably mounted on each of said wings, blades on said rotors, rotor controls operatively connected to said rotors and constructed and arranged to adjust the rotors and to vary the inclinations of the thrust vectors of said rotors, differential pitch controls operatively connected to said rotors and constructed and arranged differentially to vary the pitch of said blades, rotor-tilting mechanism operatively connected to said rotors and constructed and arranged to tilt said rotors between preponderantly lifting positions and preponderantly propulsive positions, and deactivating mechanism interlinking said thrust-vector controls and said differential pitch controls with said rotor-tilting mechanism whereby the effectiveness of said thrust-vector controls and of said differential-pitch controls is reduced as said rotors are tilted toward their preponderantly propulsive positions.

3. In an aircraft having a wing extending beyond each side of a fuselage, a rotor tiltably mounted on each of said wings, blades on said rotors, rotor controls operatively connected to said rotors and constructed and arranged to vary the inclinations of the thrust vectors of said rotors, collective pitch controls operatively connected to said rotors and constructed and arranged to adjust the rotors and to vary the pitch of said blades in unison, rotor-tilting mechanism operatively connected to said rotors and constructed and arranged to tilt said rotors between preponderantly lifting positions and preponderantly propulsive positions, and deactivating mechanism and automatic control mechanism interlinking said thrust-vector controls and said collective pitch controls, respectively, with said rotor-tilting mechanism whereby the effectiveness of said thrust-vector controls is reduced and whereby the collective pitch of said blades is increased as said rotors are tilted toward their preponderantly propulsive positions.

4. In an aircraft having a wing extending beyond each side of a fuselage, a rotor tiltably mounted on each of said wings, blades on said rotors, rotor controls operatively connected to said rotors and constructed and arranged to adjust the rotors and to vary the inclinations of the thrust vectors of said rotors, differential pitch controls operatively connected to said rotors and constructed and arranged to adjust the rotors and differentially to vary the pitch of said blades, collective pitch controls operatively connected to said rotors and constructed and arranged to adjust the rotors and to vary the pitch of said blades in unison, rotor-tilting mechanism operatively connected to said rotors and constructed and arranged to tilt said rotors between preponderantly lifting positions and preponderantly propulsize positions, and deactivating mechanism interlinking said thrust-vector controls, and deactivating mechanism interlinking said differential pitch controls, and automatic mechanism interlinking said collective pitch controls, respectively, with said rotor-tilting mechanism whereby the effectiveness of said thrust-vector controls and of said differential pitch controls is reduced and whereby the collective pitch of said blades is increased as said rotors are tilted toward their preponderantly propulsive positions.

5. In an aircraft, a rotor tiltably mounted on said aircraft, rotor controls operatively connected to said rotor and constructed and arranged to adjust the rotor and to vary the inclination of the thrust vector of said rotor, rotor-tilting mechanism operatively connected to said rotor and constructed and arranged for tilting said rotor between a preponderantly lifting position and a preponderantly propulsive position, and deactivating mechanism operatively connected to said rotor and constructed and arranged to adjust the rotor and to deactivate said thrust-vector controls whereby said thrust-vector controls may be rendered ineffective when said rotor is in its preponderantly propulsive position.

6. In an aircraft, a rotor tiltably mounted on said aircraft, blades on said rotor, rotor controls operatively connected to said rotor and constructed and arranged to adjust the rotor and to vary the inclination of the thrust vector of said rotor, collective pitch controls operatively connected to said rotor and constructed and arranged to adjust the rotor and to vary the pitch of said blades, rotor-tilting mechanism operatively connected to said rotor and constructed and arranged to tilt said rotor between a preponderantly lifting position and a preponderantly propulsive position, and deactivating mechanism interlinking said thrust-vector controls and automatic control mechanism interlinking said collective pitch controls, respectively, with said rotor-tilting mechanism whereby the effectiveness of said thrust-vector controls is reduced and whereby the pitch of said rotor is increased as said rotor is tilted toward its preponderantly propulsive position.

7. An airplane including a wing extending beyond each side of a fuselage, a rotor tiltably mounted on each of said wings; blades on said rotors; mechanism operatively connected to said rotors and constructed and arranged to tilt said rotors between preponderantly lifting positions and preponderantly propulsive positions; airplane controls operatively connected to said rotors and constructed and arranged to control said airplane in rolling, pitching and turning; differential pitch controls interconnected with the airplane rolling control and constructed and arranged to vary the pitch of said blades differentially; rotor controls interconnected with the airplane pitching and turning controls and constructed and arranged to vary the fore and aft inclination of the thrust vectors of said rotors in unison when said pitching control is actuated and to vary the fore and aft inclination of the thrust vectors of said rotors differentially when said turning control is actuated; collective pitch controls constructed and arranged to adjust the rotors and to vary the collective pitch of said blades in unison; and mechanism interlinking the tilting of said rotors with the thrust-vector controls, the differential pitch controls and the collective pitch controls constructed and arranged to adjust the rotors and to reduce the effectiveness of said thrust-vector controls and of said differential pitch controls and to increase the collective pitch of said rotors as said rotors are tilted toward their preponderantly propulsive positions.

8. A control mechanism for a tiltable rotor including a support for said mechanism, a housing tiltably supported thereon, a power drive-shaft extending from said support into said housing, a rotor-spindle journaled in said housing and operatively connected to said power drive-shaft, tilting-means to rotate said rotor-spindle about said drive-shaft, blades on said rotor-spindle, blade-controls mounted on said housing adjacent said rotor-spindle, said blade controls including a pitch-control member, a swash-plate pivotally supported on said pitch-control member, said swash-plate pivotally connected to said blades at its periphery, a cyclic-control rod connected to said swash-plate, a control-shaft for moving said cyclic-control rod axially, and a control-shaft arranged to move said pitch-control member and said cyclic-control rod axially and in unison.

9. A control mechanism for a tiltable rotor, including a support for said mechanism, a housing tiltably supported thereon, a power drive-shaft extending from said support into said housing, a rotor-spindle journaled in said housing and operatively connected to said drive-shaft and disposed transversely of said drive-shaft, blades on said rotor-spindle, blade-controls mounted on said housing adjacent said rotor-spindle, said blade-controls including a pitch-control member, a swash-plate pivotally supported on said pitch-control member, said swash-plate connected to said blades at its periphery, a cyclic-control rod connected to said swash-plate, a control-shaft for moving said cyclic-control rod axially, and a control-shaft arranged to move said pitch-control member and said cyclic-control rod axially and in unison.

10. A control mechanism for a tiltable rotor, including a support for said mechanism, a housing tiltably supported thereon, a power drive-shaft extending from said support into said housing, a rotor-spindle journaled in said housing and operatively connected to said drive-shaft and disposed transversely of said drive-shaft, and tilting means between said support and said housing whereby to tilt said rotor-spindle about the axis of said power drive-shaft, blades on said rotor-spindle, blade-controls mounted on said housing adjacent said rotor-spindle, said blade-controls including a pitch-control member, a swash-plate pivotally supported on said pitch-control member, said swash-plate pivotally connected to said blades at its periphery, a cyclic-control rod connected to said swash-plate, a control-shaft for moving said cyclic-control rod axially, and a control-shaft arranged to move said pitch-control member and said cyclic-control rod axially and in unison.

11. A control mechanism for a tiltable rotor including a support for said mechanism, a housing tiltably supported thereon, a power drive-shaft extending from said support into said housing, a rotor-spindle journaled in said housing and operatively connected to said power drive-shaft, tilting-means to rotate said rotor-spindle about said drive-shaft, blades on said rotor-spindle, blade-controls mounted on said housing adjacent said rotor-spindle, said blade-controls including a pitch-control member, a swash-plate pivotally supported on said pitch-control member, said swash-plate pivotally connected to said blades at its periphery, a cyclic-control rod connected to said swash-plate, a control-shaft for moving said cyclic-control rod relative to said pitch-control member, a lower control-shaft arranged to move said pitch-control member and said cyclic-control rod jointly, an upper control-shaft arranged to move said pitch-control member and said cyclic-control rod jointly independently of said lower control-shaft, said cyclic-control shaft and said lower joint control-shaft being rotatably supported on said housing, and deactivating mechanism on said support connected to said cyclic control-shaft and to said lower joint control-shaft arranged progressively to render inoperative the control means for said cyclic control-shaft and for said lower joint control-shaft when said rotor-spindle is tilted from a preponderantly lifting position to a preponderantly propulsive position, said upper joint control-shaft being rotatably supported at one end on said support and arranged automatically to increase the pitch of said blades when said rotor-spindle is tilted.

12. A control mechanism for a tiltable rotor, including a support for said mechanism, a housing tiltably supported thereon, a power drive-shaft extending from said support into said housing, a rotor-spindle journaled in said housing and operatively connected to said drive-shaft and disposed transversely of said drive-shaft, and tilting means between said support and said housing whereby to tilt said rotor-spindle about the axis of said power drive-shaft, blades on said rotor-spindle, blade-controls mounted on said housing adjacent said rotor-spindle, said blade-controls including a pitch-control member, a swash-plate pivotally supported on said pitch-control member, said swash-plate pivotally connected to said blades at its periphery, a cyclic-control rod connected to said swash-plate, a control-shaft arranged to move said cyclic-control rod axially relative to said pitch-control member, a lower control-shaft arranged to move said pitch-control member and said cyclic-control rod jointly, an upper control-shaft arranged to move said pitch-control member and said cyclic-control rod jointly independently of said lower control-shaft, said cyclic control-shaft and said lower joint control-shaft being rotatably supported on said housing, and deactivating mechanism on said support connected to said cyclic control-shaft and to said lower joint control-shaft arranged progressively to render inoperative the control mechanism for said cyclic control-shaft and for said lower joint control-shaft when said rotor-spindle is tilted from a preponderantly lifting position to a preponderantly propulsive position, said upper joint control-shaft being rotatably supported adjacent one end on said support and arranged automatically to increase the pitch of said blades when said rotor-spindle is tilted toward its preponderantly propulsive position.

13. In an aircraft having a wing extending beyond each side of a fuselage, a rotor tiltably mounted on each of said wings, rotor controls including cyclic-pitch controls operatively connected to said rotors and constructed and arranged to adjust the rotors and to vary the pitches of said rotors cyclically, rotor-tilting mechanism operatively connected to said rotor and constructed and arranged to tilt said rotors between preponderantly lifting positions and preponderantly propulsive positions, and deactivating mechanism interlinking said cyclic-pitch controls with the said rotor-tilting mechanism whereby the effectiveness of said cyclic-pitch controls is reduced as said rotors are tilted toward their preponderantly propulsive positions.

14. In an aircraft, a pair of rotors tiltably mounted on said aircraft, rotor-controls including control means common to both of said rotors and operatively connected to said rotors and constructed and arranged to adjust the rotors to vary the inclination of the thrust-vectors of said rotors, rotor-tilting mechanism operatively connected to said rotors and constructed and arranged for tilting said rotors between a preponderantly lifting position and a preponderantly horizontally-propulsive position, and deactivating mechanism operatively connected to said rotors and constructed and arranged to adjust said rotors and to reduce the effectiveness of said thrust-vector-varying controls when said rotors are in their preponderantly horizontally-propulsive positions.

15. In an aircraft including a fuselage, a rotor tiltably mounted on said aircraft on each side of said fuselage, rotor controls including control means common to both of said rotors and operatively connected to said rotors and including cyclic pitch control means to vary the pitches of said rotors cyclically, rotor-tilting mechanism operatively connected to said rotors and constructed and arranged to tilt said rotors between preponderantly lifting positions and preponderantly horizontally-propulsive positions, and means for reducing the effectiveness of said cyclic pitch control means as said rotors are tilted toward their preponderantly horizontally-propulsive positions.

References Cited in the file of this patent

UNITED STATES PATENTS

| Number | Name | Date |
|---|---|---|
| 1,392,763 | Hedtler | Oct. 4, 1921 |
| 1,868,975 | Hall | July 26, 1932 |
| 1,951,817 | Blount | Mar. 20, 1934 |
| 2,230,370 | Baynes | Feb. 4, 1941 |
| 2,284,902 | Hosford | June 2, 1942 |
| 2,316,438 | Lea | Apr. 13, 1943 |
| 2,437,330 | Mullgardt | Mar. 9, 1948 |
| 2,444,070 | Stanley | June 29, 1948 |
| 2,478,847 | Stuart | Aug. 9, 1949 |
| 2,482,460 | Browne | Sept. 20, 1949 |
| 2,494,217 | Watson | Jan. 10, 1950 |
| 2,496,624 | Heintze | Feb. 7, 1950 |
| 2,537,623 | Campbell | Jan. 9, 1951 |
| 2,557,338 | Caldwell | June 19, 1951 |
| 2,629,570 | Carnahan | Feb. 24, 1953 |